US007988885B2

(12) United States Patent
Percec et al.

(10) Patent No.: US 7,988,885 B2
(45) Date of Patent: Aug. 2, 2011

(54) ELECTROCHROMIC ELECTROLYTE BLENDS

(75) Inventors: Simona Percec, Philadelphia, PA (US); Susan H. Tilford, Ewing, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 136 days.

(21) Appl. No.: 12/297,319

(22) PCT Filed: Jun. 23, 2006

(86) PCT No.: PCT/US2006/024549
§ 371 (c)(1),
(2), (4) Date: Oct. 16, 2008

(87) PCT Pub. No.: WO2007/149091
PCT Pub. Date: Dec. 27, 2007

(65) Prior Publication Data
US 2009/0078917 A1   Mar. 26, 2009

(51) Int. Cl.
*H01B 1/20* (2006.01)
*H01B 1/22* (2006.01)
*H01B 1/24* (2006.01)
*G02F 1/15* (2006.01)

(52) U.S. Cl. ........ 252/511; 252/506; 252/512; 252/513; 252/514; 252/519.21; 252/519.32; 252/519.34; 252/520.1; 252/520.3; 252/521.2; 252/521.6; 252/500; 252/583; 359/265

(58) Field of Classification Search .......... 252/511, 252/506, 512, 513, 514, 519.21, 519.32, 252/519.34, 520.1, 520.3, 521.2, 521.6, 500, 252/583; 359/265
See application file for complete search history.

(56) References Cited

U.S. PATENT DOCUMENTS

| | | | | |
|---|---|---|---|---|
| 5,604,626 A * | 2/1997 | Teowee et al. | ........... | 359/265 |
| 5,729,379 A * | 3/1998 | Allemand et al. | ........... | 359/270 |
| 5,838,483 A * | 11/1998 | Teowee et al. | ........... | 359/265 |
| 6,246,505 B1 * | 6/2001 | Teowee et al. | ........... | 359/241 |
| 6,266,177 B1 * | 7/2001 | Allemand et al. | ........... | 359/265 |
| 6,421,162 B2 * | 7/2002 | Ikai et al. | ........... | 359/266 |
| 6,532,098 B1 * | 3/2003 | Kobayashi et al. | ........... | 359/265 |
| 6,535,322 B2 * | 3/2003 | Asano et al. | ........... | 359/269 |
| 6,606,183 B2 * | 8/2003 | Ikai et al. | ........... | 359/265 |
| 6,728,022 B2 * | 4/2004 | Asano et al. | ........... | 359/265 |
| 6,795,226 B2 * | 9/2004 | Agrawal et al. | ........... | 359/265 |
| 6,906,842 B2 * | 6/2005 | Agrawal et al. | ........... | 359/265 |
| 2005/0219678 A1 * | 10/2005 | Lenhard et al. | ........... | 359/265 |
| 2007/0131949 A1 * | 6/2007 | Liu | ........... | 257/89 |
| 2007/0132371 A1 * | 6/2007 | Liu | ........... | 313/504 |
| 2008/0128286 A1 * | 6/2008 | Wu et al. | ........... | 205/95 |
| 2008/0128287 A1 * | 6/2008 | Wu et al. | ........... | 205/109 |
| 2008/0128665 A1 * | 6/2008 | Wu et al. | ........... | 252/518.1 |
| 2009/0279160 A1 * | 11/2009 | Percec et al. | ........... | 359/265 |

FOREIGN PATENT DOCUMENTS

| | | |
|---|---|---|
| EP | 0995786 A1 | 4/2000 |
| EP | 1010741 A2 | 6/2000 |
| EP | 1045276 A | 10/2000 |
| WO | 2006008776 A1 | 1/2006 |

OTHER PUBLICATIONS

B. Scrosati, Electrode and Electrolyte Materials for Polymer-Based Lithium Batteries, J. Electrochem. Soc., 1989, vol. 136:2774-2782.
E. A. R. Duek et al., Solid-State Electrochromic Device Based on Polyaniline Prussian Blue and an Elastomeric Electrolyte, Adv. Materials, 1993, vol. 5:650-652.
Wilson A. Gazotti et al., An All-Plastic and Flexible Electrochromic Device Based on Elastomeric Blends, Advanced Materials, 1998, vol. 10:1522-1525.
International Preliminary Report on Patentability, PCT International Application PCT/US2006/024549, Jan. 6, 2009.
Kobayashi et al., Electrochromic Imaging With Polymer Electrolyte Having High-Temperature-Dependent Conductivity, Solar Energy Materials and Solar Cells, Elsevier Science Publishers, Amsterdam NL, vol. 90, No. 4, Mar. 6, 2006, pp. 538-545.
Ito et al., Polyether/Salt Hybrid: 5. Phase and Bulk Electrochemical Response of Viologens Having Poly(Ethylene Oxide) Chain, Polymer, vol. 38, No. 4, pp. 921-926, 1997.

\* cited by examiner

Primary Examiner — Douglas M C Ginty

(57) ABSTRACT

The present invention is directed to electrochromic electrolyte polymer blends. These blends comprise an amorphous polymer and an electrochromophore component. The electrochromophore component comprises a polyalkylene polymer copolymerized with an electrochromic moiety. The blends can be used to make elastomeric films and coatings that can be used in laminates, which can be used to form manufactured articles such as architectural and vehicular glazing, eyewear, displays and signage.

18 Claims, 1 Drawing Sheet

ELECTROCHROMIC ELECTROLYTE BLENDS

FIELD OF THE INVENTION

The present invention is directed to electrochromic electrolyte polymer blends. The blends comprise an amorphous polymer and an electrochromophore component. The electrochromophore component comprises a polyalkylene polymer copolymerized with an electrochromic moiety. These blends can be used to make elastomeric films and coatings that can be used in laminate structures used in manufactured articles such as architectural and vehicular glazing, eyewear, displays and signage.

BACKGROUND

Organic conducting polymers and organic electroactive polymers have been used to make electrochromic devices. However, there remains a need for elastomeric electrochromic polymers that are easily manufactured, exhibit desired electrochromic characteristics, can be covalently bonded to an electrode, have a long life-time, and can be used in an all solid-state electrochromic system.

Electrochromic systems based on polymeric electrolytes are known [B. Scrosati, J. Electrochem Soc., 1989, 136, 2774]. One example comprises polyethylene oxide and lithium salts. However, the disclosed system requires a relatively high temperature of operation (i.e., about 100° C.). This is because the conductivity is a property of the amorphous, elastomeric phase, and the transition from the crystalline to amorphous state for the PEO/Li complexes occurs above about 60° C.

Elastomer electrolytes blended with inorganic or organic chromophores have been reported [E. A. R. Duek, et al., Adv. Materials 5, 650, 1993].

World Patent Publication WO/2006/008776 discloses electrochromic compositions obtained by blending polymers with electrochromic molecules and placticizers.

Blends of conducting polymers with thermoplastics or elastomers to produce materials that exhibit the electrochromic properties of the conducting polymers are also known. For example, W. A. Gazotti et al. have disclosed solid state devices using two optically complementary electrochromic blends deposited on transparent electrodes (ITO) and a polymeric electrolyte [Advanced Materials, 1998, 10, no 18, p 1522-1525].

Improvements are desirable, however, in uniformity, consistency, efficiency, and durability.

SUMMARY

One aspect of the invention is a composition comprising:
a. an amorphous (co)polymer comprising one or more repeat units, (I),

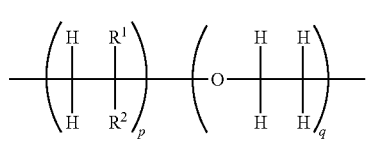

wherein
p and q are independently selected from integers from 0 to 10,000, provided that at least one of p and q is greater than 0;
$R^1$ is selected from the group consisting of H and substituted and unsubstituted alkyl;
$R^2$ is selected from the group consisting of H, OH, $R^1$, $OR^1$, $OC(O)R^4$, $COOR^1$, and $COOR^3$;
$R^3$ is selected from the group consisting of H, Na, and K;
$R^4$ is substituted or unsubstituted alkyl; and
b. an electrochromophore component comprising polyalkyleneoxide and an electrochromic moiety; and
c. an ion source.

Another aspect of the invention is a laminate comprising:
a. a first electrically conductive substrate; and
b. an electrochromic layer in contact with the substrate, comprising:
  i. an amorphous (co)polymer comprising one or more repeat units, (I),

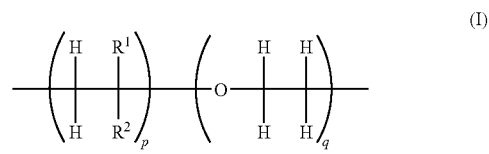

wherein
p and q are independently selected from integers from 0 to 10,000, provided that at least one of p and q is greater than 0;
$R^1$ is selected from the group consisting of H and substituted and unsubstituted alkyl;
$R^2$ is selected from the group consisting of H, OH, $R^1$, $OR^1$, $OC(O)R^4$, $COOR^1$, and $COOR^3$;
$R^3$ is selected from the group consisting of H, Na, and K;
$R^4$ is substituted or unsubstituted alkyl; and
  ii. an electrochromophore component comprising polyalkyleneoxide and an electrochromic moiety; and
  iii. an ion source.

DETAILED DESCRIPTION

Figure 1:
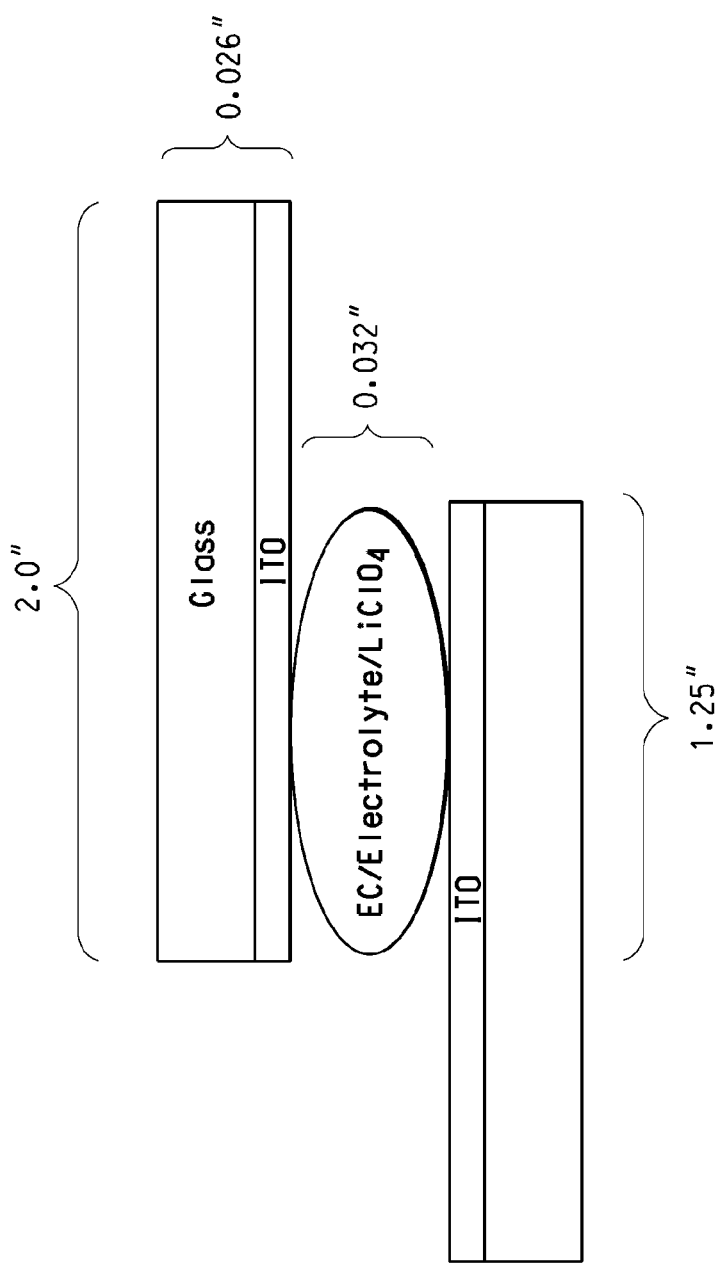
FIG. 1 is a schematic of an all solid state electrochromic device containing an electrochromic electrolyte blend according to one embodiment of the invention.

The blend compositions disclosed herein provide electrochromic materials that display good color uniformity and good contrast and can be used to generate a wide range of colors. Coloration efficiency and long lifetimes are achieved by the incorporation of certain functional groups in the electrochromic moiety to improve contact of the blend compositions with the electrodes of the electrochromic device.

Electrochromism, as used herein, is a reversible and visible change in the transmittance and/or reflectance of a material as the result of electrochemical oxidation or reduction. Electrochromic materials can be either organic or inorganic materials that display electrochromism.

Amorphous polymers are those that display substantially no crystalline domains in the solid state.

One embodiment of this invention is a composition comprising:
a. an amorphous (co)polymer comprising one or more repeat units, (I),

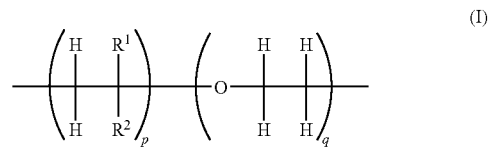

wherein p and q are integers of 0 to 10,000, and at least one of p and q is greater than 0;

$R^1$ is selected from a group consisting of H, and substituted and unsubstituted alkyl;

$R^2$ is selected from a group consisting of H, OH, $R^1$, $OR^1$, $OC(O)R^4$, $COOR^1$, and $COOR^3$;

$R^3$ is selected from a group consisting of H, Na, and K;

$R^4$ is substituted or unsubstituted alkyl;

b. an electrochromophore component comprising polyalkyleneoxide and an electrochromic moiety; and c. an ion source.

As used herein, "(co)polymer" denotes a homopolymer or copolymer. In particular, the amorphous (co)polymer can contain repeat units of

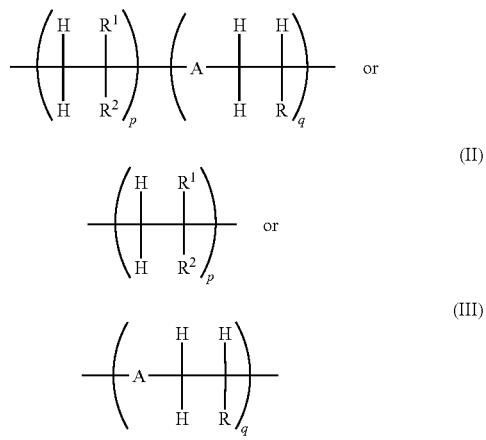

or any combination of (I), (II), and/or (III). Other repeat units can also be present, such as Structure (X):

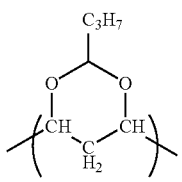

Structure (X)

Suitable alkyl groups of the amorphous (co)polymer include $C_1$-$C_{10}$ alkyl groups. Suitable substituents on the alkyl groups include halo groups, hydroxyl, carboxyl, amino, and cyano groups.

Suitable polyalkylene oxides can be linear or branched. In one embodiment, linear polyalkylene oxide corresponds to the formula —$(O(CH_2)_r(CHR)_s)$—, where r and s are integers from 0-10,000, with the proviso that at least one of r and s is not zero. Suitable branched polyalkylene oxides include, for example:

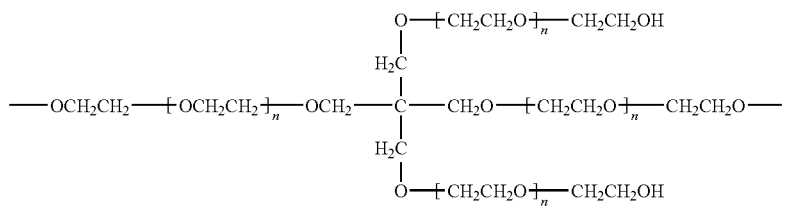

where each n is an integer from 0 to 1000.

Suitable electrochromic moieties cause the blend composition to exhibit a reversible and visible change in its transmittance and/or reflectance upon electrochemical oxidation or reduction. The electrochromic moiety can be covalently attached to the polyalkylene oxide, or can be blended with the polyalkylene oxide.

Each electrochromic moiety comprises a redox-active group and an optional linker group interposed between the redox-active group and the polyalkylene oxide units. Suitable linkers include —$(CH_2)_m$—, —$CH_2$—$OC(O)(CH_2)_n$—, and —$(CH_2CH_2NH)$—, where m and n are integers from 1 to 1000.

Linker groups can also comprise connecting groups such as ester (—$CO_2$—), amide (—N(CO)—), ether (—O—), or thioether (—S—) groups, interposed between either the polyalkylene oxide backbone and the linker or between the linker and the redox-active group.

Suitable electrochromic moieties include bipyridinium systems; electroactive conducting polymers such as polyanilines, polypyrroles, polythiophenes and polythiophene copolymers, and polycarbazole; carbazoles; methoxybiphenyl compounds; quinones; diphenylamines; phenylene diamines; pyrazolines; tetracyanoquinodimethane (TCNQ); and tetrathiafulvalene (TTF).

Suitable redox-active groups in the electrochromic moieties include substituted and unsubstituted aromatic and heteroaromatic groups corresponding to structures IV-IX:

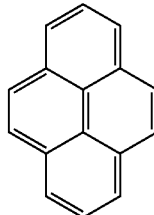

IV

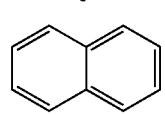

V

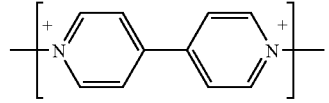

VI

-continued

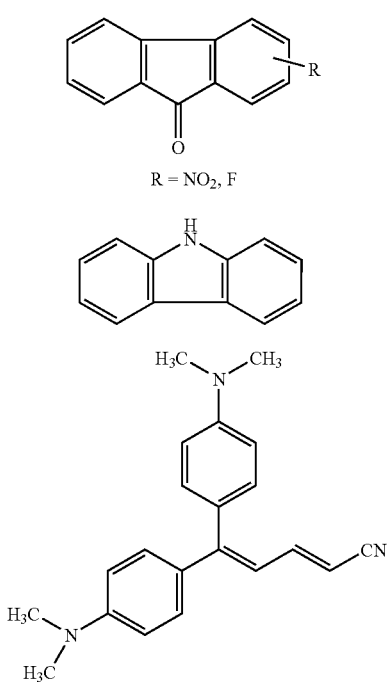

VII

R = NO₂, F

VIII

IX

Except for structure VI, the points of attachment to the polyalkylene oxide, linker or connecting group are not shown. Any point of attachment is suitable, as long as the aromatic character of the system is maintained. Structure VI has two potential points of attachment. Typically, both nitrogens of the bipyridilium system are attached to the polymer backbone, linker or connecting group. The positive charge on these quaternary nitrogens is balanced by anions such as halides. For a terminal bipyridilium group, one of the nitrogens is typically connected covalently or ionically to an alkyl group, an aryl group, a halogen, p-toluene-sulfonyl, hexafluorophosphate, trifluoromethanesulfonate ($CF_3SO_3$—), trifluoromethanesulfonimide (($CF_3SO_2)_2N$—), or H, either directly or with intervening linker and/or connecting groups.

Suitable substituents on the aromatic or heteroaromatic rings of the redox-active groups include: $C_1$-$C_{10}$ alkyl groups such as methyl, ethyl, propyl, butyl, pentyl, hexyl, heptyl, octyl, and iso-pentyl; aromatic groups such as phenyl and substituted phenyl; —CN; and amines such as —$N(C_2H_5)_2$ and —$N(CH_3)_2$ groups. The substituents attached to the aromatic or heteroaromatic groups can influence the conduction properties of the composition and its response to voltage fluctuations. Different substituents can be used to provide compositions of different colors. By varying the redox-active group and/or the substitutents on the aromatic group of the electrochromic moiety, the compositions of this invention can be produced in a wide range of colors.

The electrochromic moieties can also comprise functional groups to improve bonding to the electrodes of an electrochromic device. Suitable functional groups include —SH, pyridine, —CN, and —SCN, and can be used to promote the absorption and/or self-assembly of the electrochromophore onto electrode surfaces (e.g., Au, Cu, Pd, Pt, Ni, and Al). Other functional groups, such as —COOH and —$P(O)(OH)_2$, can be used to improve the binding or self-assembly of the composition onto ITO (indium tin oxide) or $Al_2O_3$ surfaces. Alcohol and amine functionalities are useful in binding to Pt surfaces. Having direct contact and good binding between the electrochromophore and the electrodes in a solid-state system can enhance coloration efficiency.

The electrochromic groups can also contain functional groups such as —$SO_3K$ or —$ClO_3Li$. When such compositions are used to assemble electrochromic devices, little or no additional electrolyte is required.

The electrochromic moieties that are attached to a polyalkylene oxide polymer are not pendant from the polymer backbone, but rather are part of the backbone of the polymer. Each polyethylene oxide chain can contain more than one electrochromic moiety. Chains that contain more than one electrochromic moiety can contain more than one type of electrochromic moiety, e.g., electron-donors and electron-acceptors. The density of the electrochromic moieties (i.e., the number of electrochromic moieties per unit of chain length) can be varied by controlling the length of the polyalkylene oxide segments. The distance between neighboring electrochromic moieties can also be controlled by the use of linker groups of different sizes. The electrochromic moieties can also be at the end(s) of the chain.

In one embodiment of this invention, the amorphous (co) polymer comprises predominantly repeat units of structure III, such as, for example, when the backbone comprises poly (ethylene oxide) or poly(epichlorohydrin).

In another embodiment of this invention, the amorphous (co)polymer comprises predominantly repeat units of structure II, as in polyvinyl butyral.

In another embodiment of this invention, the amorphous polymer backbone is a copolymer comprising at least one repeat unit of structure II and at least one repeat unit of structure III, such as in poly(ethylene oxide-co-epichlorohydrin) and copolymers derived from ethylene, methacrylic acid and salt forms of methacrylic acid (e.g., Surlyn® resins, available from E.I. DuPont de Nemours, Inc., Wilmington, Del.).

The ion source can be an inorganic salt such as LiCl or an organic salt such as tetrabutyl ammonium bromide that is added to the co-polymer and the electrochromophore component. The polyalkylene oxide component tends to promote the dissolution of the salt, and the resulting ions increase the conductivity of the polymer. The salts also inhibit the crystallization of polyalkylene oxide. Some electrochromophore groups (e.g., viologen) are ionic and can serve as the ion source for the compositions of this invention.

The amorphous (co)polymers can be prepared by any of several different methods known to those skilled in the art. Many suitable (co)polymers are commercially available.

In some embodiments, the redox-active group itself can be directly attached to the polyalkylene oxide backbone. In other embodiments, it may be necessary or preferred, to attach a linker group to the redox-active group to provide the desired molecular structure or to provide a more reactive group to facilitate the incorporation of the electrochromic group into the backbone. By way of illustration, Examples 1 and 2 (below) describe the preparation of a polyethylene oxide with a bipyridilium moiety in the polymer backbone. Condensation reactions to form ester, amide or ether bonds are useful reactions for incorporating the linking, connecting and/or redox-active groups to each other and/or to the polymer backbone.

The amorphous polymer and the polyalkylene oxide-based polymer can be blended with additives such as plasticizers, electron mediators, and/or conductive particles. An electron mediator is an auxiliary redox active compound that acts as an electron-transfer "catalyst". During the redox reaction (which is a complex process and takes place in several steps), the electron mediator accepts electrons from the electrode (is reduced) or donates electrons to the electrode (is oxidized). In this activated form, the mediator is able to transfer or take electrons from the electroactive center of the electrochromic compound. Electron mediators include ferrocene, other metallocenes, their derivatives and mixtures; and phenazine and its derivatives and mixtures. Addition of salts can significantly improve the ion-conductivity of the blend and consequently enhance the electrochromic properties of the blend.

For most applications, to increase the mobility of the ions, the Tg of the amorphous polymer is desirably less than the ambient temperature in which the device made from the polymer is being used. In some embodiments of this invention, a Tg of less than 100° C. is sufficient; under some circumstances, the Tg of the amorphous polymer is desirably less than 50° C., or less than 25° C. or less than 0° C. The desired Tg can be achieved by the use of plasticizers and/or other additives.

Suitable plasticizers include tetraethylene glycol diheptanoate; triethylene glycol-di-2-ethyl hexanoate; 2-ethyl-1-hexanol; polyethylene glycol and its derivatives; adipates such as dihexyl adipate and dioctyl adipate; phosphates such as 2-ethylhexyl diphenyl phosphate, isodecyl diphenyl phosphate, tert-butylphenyl diphenyl phosphate, triaryl phosphate ester blends, tricresyl phosphate, and triphenyl phosphate; phthalates such as alkyl benzyl phthalate, butylbenzyl phthalate, dibutyl phthalate, and dioctyl phthalate; sebacates such as dibutyl sebacate; and sulfonamides such as toluene sulfonamide and n-ethyl sulfonamide.

Suitable conductive particles include inorganic particles formed from metals, ITO, carbon nanotubes, and $TiO_2$. Suitable organic conductive particles can be formed from conductive polymers such as polyanilines, polypyrroles, polythiophenes and polythiophene copolymers. Suitable particle sizes include those from 10 nm-100 μm, preferably 10 nm to 1 μm.

The electrochromic electrolyte blends disclosed herein can be used to make elastomeric electrochromic films by standard film-forming techniques, and the films, in turn, can be used in laminate structures that are useful in architectural or vehicular applications. For example, the elastomeric electrochromic films can be laminated between layers of glass coated with transparent electrodes (e.g., ITO). When a small voltage is applied to the electrodes—typically from about 0.5 V to about 6.0 V—the transparency and/or color of the glass-and-film laminate structure can be altered. The type of change (e.g., color or opacity) and the degree of change (e.g., the optical density and/or color of the transmitted light) depends on the thickness of the film as well as the nature of the electrochromic moiety. Removing the voltage source, or reversing the polarity, will typically result in the color and/or opacity returning to their original state. This ability to reversibly change the optical properties of the blend composition by applying a small voltage makes it highly useful in articles such as sunglasses, helmets, visors, goggles, architectural glazing, automotive glazing, displays, signage, and mirrors.

FIG. 1 is a schematic of a typical electrochromic device 100 incorporating a composition of the invention. In this embodiment, the substrate layers 110 are coated with a conductive layer 120. Layer 130 is in contact with both conductive layers and comprises the blend of an amorphous polymer with a polyethylene oxide polymer and additives. Color change occurs when a power source is attached to the conductive layers and a voltage is applied.

Suitable film-forming techniques include casting, extrusion, spraying, and dip-coating. Free-standing film is preferred in some applications. Self-assembly of self-doped compositions into mono-layers or multi-layers on a substrate surface can be achieved by standard methods, including microcontact printing and/or flooding the metal or ITO surfaces.

Lamination processes are well-known to those skilled in the art and can be used to make laminate structures in which an elastomeric electrochromic film is sandwiched between two substrates. Suitable substrates include non-conductive substrates such as glass and polymer sheets or films. For use in electrochromic devices, electrically conductive substrates are used, such as metal sheets or foils, or non-conductive substrates coated or laminated with an electrically conductive material, such as ITO. Polymer substrates are especially useful for making flexible laminate structures, and suitable substrate polymers include polyesters (e.g., poly(ethylene terephthalate), poly(ethylene naphthalate), and poly(ethylene-isosorbide terephthalate)—a high glass transition temperature (Tg) polymer comprising repeat units derived from ethylene glycol, isosorbide and a terephthalate moiety); polyimides (e.g., Kapton® polyimide); polyamides (e.g., Nomex® polyamide, Kevlar®) polyamide; polycarbonate; polyphenylene oxide; polysulfones; cellulosics; and polymer blends, such as polystyrene/polyphenylene oxide.

Fabrication of articles from laminated structures or coated substrates can be carried out using standard techniques for cutting and/or shaping the glass or polymer substrates.

EXAMPLES

Some embodiments of the present invention are illustrated by the following Examples. It should be understood that these Examples, while representing some embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

All reagents were purchased from Sigma-Aldrich Co., St. Louis, Mo., and used as received unless otherwise indicated.

The meaning of abbreviations used is as follows: "min" means minute(s), "hr" means hour(s), "mL" means milliliter(s), "L" means liter(s), "μL" means microliters, "mM" means millimolar, "M" means molar, "mmol" means millimole(s), "g" means gram(s), "mg" means milligram(s), "V" means volt(s), "° C." means degree Celsius.

Example 1

Preparation of Dibrominated Polyethylene Oxide

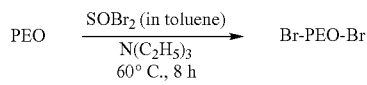

Dibromo-PEO was obtained by reacting thionyl bromide with polyethylene oxide (PEO). A solution of $SOBr_2$ (5.197 g) in toluene (132 mL) was added to polyethylene oxide (10 g, molecular weight=200 g/mol) in the presence of triethylamine (2.53 g). The reaction mixture was then heated to 60° C. for 8 hr. After the reaction was complete, the triethylammonium hydrogen bromide was filtered off. The toluene was then rotovaporated off to obtain the desired brominated compound.

Example 2

Copolymerization of Dibrominated Polyethylene Oxide with 4,4'-Dipyridyl

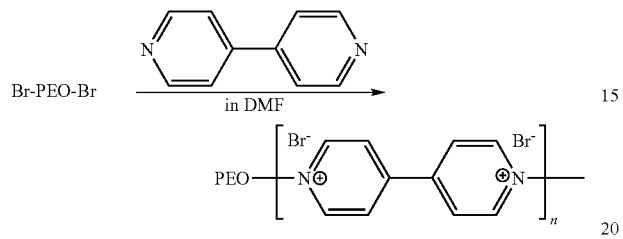

4,4'-Dipyridyl (1 g) was taken up in 20 mL of dry DMF. This solution was placed in a 100 mL 3 neck, round bottom flask connected to a $N_2$ bubbler. Dibrominated PEO (7.427 g, prepared as in Example 1) was added neat to 4,4'-dipyridyl solution, with stirring. An additional 3 mL of DMF were used to rinse the rest of the dibrominated PEO into the flask. The flask was kept under a nitrogen purge while being heated at 80° C. for 7 h and at 90° C. for 54 h. The solvent was then removed via rotoevaporation.

Example 3

Preparation of Electrochromic Polyvinyl Butyral Composition

In the dry box in a 20 mL vial with magnetic stir bar a solution in 6 mL of n-propanol was made from polyvinyl butyral (330 mg), triethyleneglycol-di-2-ethyl-hexanoate (132.5 mg) viologen-polyethylene oxide copolymer (29.7 mg, prepared as in Example 2), ferrocene (3.9 mg), lithium chloride (3.9 mg). This was solution number 1.

Separately, carbon nanotubes (31 mg, produced by CNI, Houston, Tex., using the HiPC® process) were placed into 15 mL centrifuge vial together with 200 mg of polyvinyl butyral, triethyleneglycol-di-2-ethyl-hexanoate (72 mg) and 15 mL of 1-propanol. The vial was placed into an ice bath and the ultrasonicator probe was inserted. The solution was sonicated for a total of 40 minutes. This was solution number 2.

For every milliliter of solution number 1, 10 µL of solution number 2 were added. This solution was stirred at 50° C. for 30 min.

Example 4

Preparation of the Electrochromic Device

From the solution prepared as in Example 3, 0.154 mm thick films were cast using a draw bar onto two glass slides coated with ITO (40/45 mm, Thin Film Devices, Anaheim, Calif.). The films were cast on the ITO-coated side. The two slides were placed them side by side with the two films in contact as is shown in FIG. 1. On one edge of each slide, a small region of the ITO was exposed and connected to the power supply. The slide assembly was heated at 75° C. under pressure (2.6 kg) for 45 minutes. The device was then tested for electrochromic properties using a voltammetric analyzer, CV-50W from Bioanalytical Systems, a DH-2000 light source (Ocean Optics, Inc., Dunedin, Fla.) and an HR2000 Series High Resolution Fiber Optic Spectrometer (Ocean Optics, Inc., Dunedin, Fla.). The % transmission of the device in the "off" state was 79.4. By applying a voltage of −1.2 V, a reduction in light transmission to 37.4% was achieved in the "on" state in 52 sec. The change was reversible. When the voltage was removed, the light transmission increased to 75% in 135 sec and 79.4% in 200 sec. The device was tested several times over a period of 8 days without observing any change in its functionality.

What is claimed is:

1. A composition comprising:
   a. an amorphous (co)polymer comprising one or more repeat units, (I),

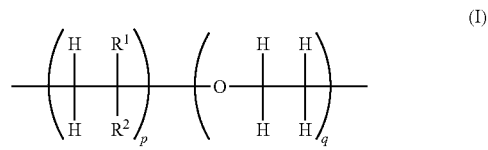

wherein p and q are independently selected from integers from 0 to 10,000, provided that at least one of p and q is greater than 0;

$R^1$ is selected from the group consisting of H, and substituted and unsubstituted alkyl;

$R^2$ is selected from the group consisting of H, OH, $R^1$, $OR^1$, $OC(O)R^4$, $COOR^1$, and $COOR^3$;

$R^3$ is selected from the group consisting of H, Na, and K;

$R^4$ is substituted or unsubstituted alkyl; and b. an electrochromophore component comprising a copolymer with a backbone comprising a polyalkyleneoxide and an electrochromic moiety, wherein the electrochromic moiety is polyaniline;

c. an ion source; and d. an electron mediator.

2. A laminate comprising:

a first electrically conductive substrate; and an electrochromic layer in contact with the substrate, comprising:

an amorphous (co)polymer comprising one or more repeat units, (I),

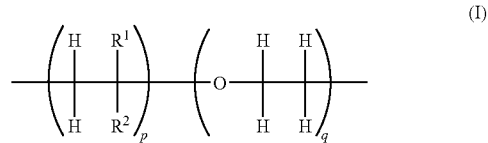

wherein p and q are independently selected from integers from 0 to 10,000, provided that at least one of p and q is greater than 0;

$R^1$ is selected from the group consisting of H, and substituted and unsubstituted alkyl;

$R^2$ is selected from the group consisting of H, OH, $R^1$, $OR^1$, $OC(O)R^4$, $COOR^1$, and $COOR^3$;

R³ is selected from the group consisting of H, Na, and K;
R⁴ is substituted or unsubstituted alkyl; and
  ii. an electrochromophore component comprising a copolymer with a backbone comprising a polyalkyleneoxide and an electrochromic moiety, wherein the electrochromic moiety is polyaniline;
an ion source; and
an electron mediator.

3. The composition of claim 1, wherein the electron mediator is selected from the group consisting of metallocenes and phenazines.

4. The composition of claim 1, further comprising a plasticizer.

5. The composition of claim 4, wherein the plasticizer is selected from the group consisting of polyethylene glycol and its derivatives; adipates; phosphates; phthalates; triaryl phosphate ester blends; sebacates; and sulfonamides.

6. The composition of claim 4, wherein the plasticizer is selected from the group consisting of tetraethylene glycol diheptanoate; triethylene glycol-di-2-ethyl hexanoate; 2-ethyl-1-hexanol; dihexyl adipate; dioctyl adipate; 2-ethylhexyl diphenyl phosphate; isodecyl diphenyl phosphate; tert-butylphenyl diphenyl phosphate; tricresyl phosphate; triphenyl phosphate; alkyl benzyl phthalate; butylbenzyl phthalate; dibutyl phthalate; dioctyl phthalate; dibutyl sebacate; toluene sulfonamide and n-ethyl sulfonamide.

7. The composition of claim 1, further comprising conductive particles.

8. The composition of claim 7, wherein the conductive particles comprise materials selected from the group consisting of metals, ITO, carbon nanotubes, $TiO_2$, polyanilines, polypyrroles, polythiophenes and polythiophene copolymers.

9. The composition of claim 8, wherein the particle size is 10 nm-100 μm.

10. The composition of claim 1, wherein the amorphous (co)polymer comprises at least one repeat unit of —($CH_2CHOH$)— and at least one repeat unit having the structure:

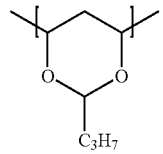

11. The composition of claim 1, wherein the amorphous (co)polymer comprises repeat units derived from ethylene, methacrylic acid and salt forms of methacrylic acid.

12. The composition of claim 1, wherein the polyalkylene oxide is selected from the group consisting of polyethylene oxide, poly(propylene oxide), copolymers of poly(ethylene oxide), poly(propylene oxide and blends thereof.

13. The laminate of claim 2, further comprising a second electrically conductive substrate in contact with the electrochromic layer.

14. The laminate of claim 13, wherein at least one electrically conductive substrate comprises a transparent, non-conductive substrate and an electrically conductive layer in contact with the electrochromic layer.

15. The laminate of claim 14 wherein the non-conductive substrate comprises a polymer selected from the group consisting of polyesters, polyimides, polyamides, polycarbonate, polyphenylene oxide, polysulfones, cellulosics, and polystyrene/polyphenylene oxide.

16. The laminate of claim 14, wherein the electrically conductive layer comprises material selected from the group consisting of ITO, titanium oxide, copper, aluminum, gold, platinum, silver, cobalt, palladium, iriduim, and rhodium.

17. A manufactured article comprising the laminate of claim 13.

18. An article of claim 17, selected from the group consisting of: architectural glazing, automotive glazing, mirrors, signage, and displays.

* * * * *